(12) United States Patent
Yamada

(10) Patent No.: US 7,930,480 B2
(45) Date of Patent: Apr. 19, 2011

(54) DATA STORAGE DEVICE, CONTROL METHOD THEREOF, AND MAGNETIC DISK STORAGE DEVICE

(75) Inventor: Shuji Yamada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 244 days.

(21) Appl. No.: 11/086,066

(22) Filed: Mar. 21, 2005

(65) Prior Publication Data

US 2005/0210190 A1 Sep. 22, 2005

(30) Foreign Application Priority Data

Mar. 22, 2004 (JP) .................................. 2004-082169

(51) Int. Cl.
*G06F 12/00* (2006.01)
(52) U.S. Cl. .......... 711/118; 711/112; 711/154; 710/14; 710/52; 710/74
(58) Field of Classification Search .................... 711/118
See application file for complete search history.

(56) References Cited

U.S. PATENT DOCUMENTS

| | | | |
|---|---|---|---|
| 5,625,794 A | 4/1997 | Inoue et al. | |
| 5,649,153 A | 7/1997 | McNutt et al. | |
| 5,761,708 A * | 6/1998 | Cherabuddi et al. | 711/118 |
| 5,815,648 A | 9/1998 | Giovannetti | |
| 6,151,660 A * | 11/2000 | Aoki | 711/129 |
| 6,321,298 B1 * | 11/2001 | Hubis | 711/124 |
| 6,430,653 B1 | 8/2002 | Fujikawa | |
| 6,704,835 B1 * | 3/2004 | Garner | 711/103 |
| 6,725,330 B1 | 4/2004 | Wong et al. | |
| 2003/0061444 A1 * | 3/2003 | Herbst et al. | 711/118 |
| 2004/0117441 A1 * | 6/2004 | Liu et al. | 709/203 |
| 2006/0020751 A1 * | 1/2006 | Ito et al. | 711/113 |

FOREIGN PATENT DOCUMENTS

| | | | |
|---|---|---|---|
| JP | 10-254778 | | 9/1998 |
| JP | 02000227865 A | * | 8/2000 |
| JP | 2000-347938 | | 12/2000 |
| JP | 2002-108704 | | 4/2002 |

OTHER PUBLICATIONS

Eugene Ra, "Cache Segmentation Settings of Ultrastar 9ES", Storage Review.com, Jun. 30, 1998. http://www.storagereview.com/articles/9806/980630cacheseg.html.*
Gene Milligan, T10 dpANS NCITS TBD-200X Project 1417D, Oct. 2000, pp. 105-113.*

* cited by examiner

*Primary Examiner* — Jared I Rutz
*Assistant Examiner* — Kalpit Parikh

(57) ABSTRACT

Embodiments of the invention improve the performance of a HDD (Hard Disk Drive). In one embodiment, MBR (Master Boot Record) is read from a magnetic disk. The read MBR is stored in a sector buffer by an event handler. A segment control section acquires the MBR stored in the sector buffer and refers to the partition type field to identify the file system. The segment control section refers to a cache mode table and selects a cache mode which is associated with the file system specified in the MBR. In the subsequent read and write operations, buffer handling and command execution control are performed according to the determined cache mode. Since an appropriate cache mode is selected depending on the file system, it is possible to raise the performance.

14 Claims, 6 Drawing Sheets

| File System G | Cache Mode |
|---|---|
| FAT 32 (LBA) | (a) No Specific Feature |
| NTFS | (f) Write Back Read Cache and Read Before Pending Write and Inhibit Read Abort Operation |
| | (b) Write Back Read Cache |
| | (c) Inhibit Read Abort Operation |
| | (d) Write Back Read Cache and Inhibit Read Abort Operation |
| | (e) Read Before Pending Write and Inhibit Read Abort Operation |

| File System G | Cache Mode |
|---|---|
| FAT 32 (LBA) | (a) No Specific Feature |
| NTFS | (f) Write Back Read Cache and Read Before Pending Write and Inhibit Read Abort Operation |
| | (b) Write Back Read Cache |
| | (c) Inhibit Read Abort Operation |
| | (d) Write Back Read Cache and Inhibit Read Abort Operation |
| | (e) Read Before Pending Write and Inhibit Read Abort Operation |

305

DATA STORAGE DEVICE, CONTROL METHOD THEREOF, AND MAGNETIC DISK STORAGE DEVICE

This application claims priority form Japanese Patent Application No. JP2004-082169, filed Mar. 22, 2004, the entire disclosure of which is incorporated herein by reference.

BACKGROUND OF THE INVENTION

The present invention relates to data storage devices, control methods thereof and magnetic disk storage devices. In particular, the invention relates to cache mode control in data storage devices.

Devices using various types of media such as optical disks and magnetic tapes are known as information recording and reproducing devices. Among them, hard disk drives (HDDs) have become popular as storage devices for computers to such an extent that they are one type of the storage devices indispensable for today's computers. Further, not limited to computers, their application is widening more and more due to the superior characteristics with the advent of moving picture recording/reproducing devices, car navigation systems, removable memories for digital cameras and so on.

Each magnetic disk used in HDDs has a plurality of tracks formed concentrically and each track is partitioned into a plurality of sectors. In each sector, sector address information and user data are stored. Either data write to a sector or data read from the sector is enabled by a magnetic head (made of a thin film) which accesses the desired sector according to the sector address information. A signal read out from a magnetic disk through data read operation is subjected to waveform shaping, decoding processing and other prescribed signal processing by a signal processing circuit before being transmitted to the host. Likewise, data transferred from the host is subjected to prescribed signal processing by a signal processing circuit and then written to the magnetic disk.

As mentioned above, when data is written to a magnetic disk or read from the magnetic disk, some access time is required by the magnetic head to access a recording sector on the magnetic disk. Therefore, cache is employed in the HDD as a technique to raise the speed of data communication with the host in order to improve the performance. The HDD is provided with a sector buffer to temporally store user data. It is possible to raise the performance by performing data communication with the host by way of the sector buffer. Read cache and write cache are widely known as caches for HDDs.

In read cache, data are preliminarily read out from the magnetic disk and stored in a sector buffer before read commands to access the addresses are received from the host (Look ahead). If a read command received from the host specifies an address from which data has been read out into the sector buffer (cache hit), the data is sent back to the host from the sector buffer without accessing the magnetic disk.

In write cache, if a write command is received from the host, write data from the host is stored in a sector buffer and a command complete is returned to the host before write to the magnetic disk is completed. The command complete allows the host to issue a new command. In particular, if two write commands attempt to write data to adjacent sectors, this contributes much to raising the processing speed since the time to access the magnetic disk can be omitted.

As buffer handling techniques in HDDs, that is, as read cache or write cache features, various methods are known in addition to the ones mentioned above. For example, in "Write Back Read Cache", if write data stored in the sector buffer is that which a received read command attempts to read, the write data stored in the sector buffer is sent back to the host regardless of whether its write to the magnetic disk is completed or not.

A cache mode setting technique is disclosed in Japanese Patent Laid-Open No. 2002-108704. In this technique, from a plurality of cache modes prepared, an appropriate cache mode is selected depending on the file access mode. According to the patent reference, which cache mode is appropriate is dependent on the program to file access mode. If an appropriate cache mode is not set and specified, performance deterioration may occur.

Thus, setting the most suitable cache mode for each file access mode raises the performance of the HDD. In the method disclosed in Japanese Patent Laid-Open No. 2002-108704, plural disk cache modes are set to the HDD as controlled by the host. Further, the host stores files in disk areas each of which is reserved for each file access type and associated with the most suitable cache mode for the file access type. When a file is used, the most suitable cache mode is set according to the file access type. Since the most suitable cache mode is set for each file, cache can be used effectively.

BRIEF SUMMARY OF THE INVENTION

As methods for assuming an access type for a file, one method infers an access type from the history of past accesses to the file whereas the method disclosed in the above patent reference prepares a plurality of disk cache modes. However, these methods cannot always achieve optimum performance. For example, in the inferring method based on the past access history, since an access type is inferred from several past accesses to the file, an appropriate cache mode is not applied to these accesses. The method disclosed in the patent reference is effective to particular simple file access types but difficult to implement for complex file access types in actual environment. Performance may be raised for file access types in actual environment if a cache mode is selected from the most suitable cache modes which are preliminarily determined through such actual benchmark measurement as to simulate the actual operating environment. However, since the most suitable cache mode differs depending on the file system (FAT or the like) used by the host, it is important to set an appropriate cache mode suitable for the file system. Meanwhile, with diversification of OSs (Operating Systems) used by personal computers as well as diversifying applications of HDDs, hosts using HDDs have begun to treat various file systems. Accordingly, it is required to change/set the HDD cache mode for each different file system used by the host.

The present invention has been made with the above-mentioned situation behind. Accordingly, it is a feature of the present invention to perform efficient cache operations for different file systems.

In the following disclosure, several components are described with reference to the corresponding components in the embodiment described later. However, this reference is made only for facilitating description. Implementation of these components is not limited to the corresponding ones shown in the embodiment.

According to a first aspect of the present invention, a data storage device comprises: a data storing medium (for example, a magnetic disk 121); a sector buffer in which write data to the medium and/or read data from the medium are temporally stored (for example, a sector buffer 307); a cache mode determining section used to determine a cache mode based on a file system of data stored on the medium (for example, a segment control section 302); and a control section handling the sector buffer according to the determined cache mode (for example, the segment control section 302). Since a cache mode is determined based on the file system, appropriate buffer handling is possible for different file systems.

In some embodiments, the cache mode determining section selects a cache mode suitable for said file system from a plurality of cache modes registered preliminarily. A cache mode table (for example, a cache mode table 305) registers therein plural file systems and the cache modes with the plural file systems associated with the cache modes; and the cache mode determining section refers to the cache mode table and selects a cache mode to be associated with one of said file systems.

In specific embodiments, the medium stores file system identifier data (for example, a partition type in FIG. 2) which specifies a file system; the data storage device further includes a file system identifying section (for example, the segment control section 302) which refers to the file system identifier data to identify the file system of data stored on the medium; and the cache mode determining section determines a cache mode suitable for the file system identified by the file system identifying section. Since the file system is identified by the data stored on the medium, it is possible for the data storage device to internally determine a cache mode using the internal data. The file system identifying section identifies the file system and the cache mode determining section determines the cache mode when the data storage device is started. This makes it possible to determine a cache mode before actual user data transmission. Also preferably, data included in a master boot record stored on the medium is used as the file system identifier data.

In some embodiments, the data storage device further includes a file system identifying section which identifies the file system of data stored on the medium; the medium stores a file system identifier data which specifies the file system; the file system identifying section refers to the file system identifier data to identify the file system when the data storage device is started; and the cache mode determining section determines a cache mode suitable for the file system identified by the file system identifying section.

According to a second aspect of the present invention, a control method for a data storage device, the device including a medium storing data from a host and a sector buffer temporally storing data from the host in data transfer between the medium and the host, comprises: (a) identifying the file system to be used by the host; (b) determining a cache mode based on the identified file system; and (c) handling the sector buffer according to the determined cache mode. Since a cache mode is determined based on the file system, appropriate buffer handling is possible for different file systems.

In some embodiments, step (b) refers to a cache mode table registering therein plural file systems and cache modes with the plural file systems associated with the cache modes, and selects a cache mode to be associated with the identified file system. This makes it possible to efficiently determine an appropriate cache mode.

In some embodiments, when the host is started, step (a) refers to file system identifier data stored preliminarily in the data storage device to identify the file system. Since the identification is made when the host is started, it is possible to determine a cache mode before actual user data transmission.

In specific embodiments, step (a) refers to file system identifier data stored preliminarily in the medium identifies the file system; and step (b) selects a cache mode suitable for the identified file system from a plurality of cache modes registered preliminarily. Since the file system is identified by data stored on the medium, it is possible for the data storage device to internally determine a cache mode by using the internal data.

In some embodiments, the method further comprises acquiring management data stored on the medium when the host is started; and step (b) refers to file system identifier data included in the management data to identify the file system.

According to a third aspect of the present invention, a magnetic disk storage device comprises: a magnetic disk storing data from a host; a sector buffer temporally storing data from the host in data transfer between the magnetic disk and the host; a file system identifying section which acquires a master boot record stored on the magnetic disk to identify a file system to be used by an operating system of the host; a memory section which stores a cache mode table registering therein plural file systems and cache modes with the plural file systems associated with the cache modes; a cache mode determining section which searches the cache mode table and determines a cache mode associated with the identified file system; and a control section which handles the sector buffer according to the determined cache mode. Since a cache mode is determined based on the file system, appropriate buffer handling is possible for different file systems.

BRIEF DESCRIPTION OF THE DRAWINGS

FIG. 5 shows an example of a configuration of a cache mode table in this embodiment.

DETAILED DESCRIPTION OF THE INVENTION

Figure 1:
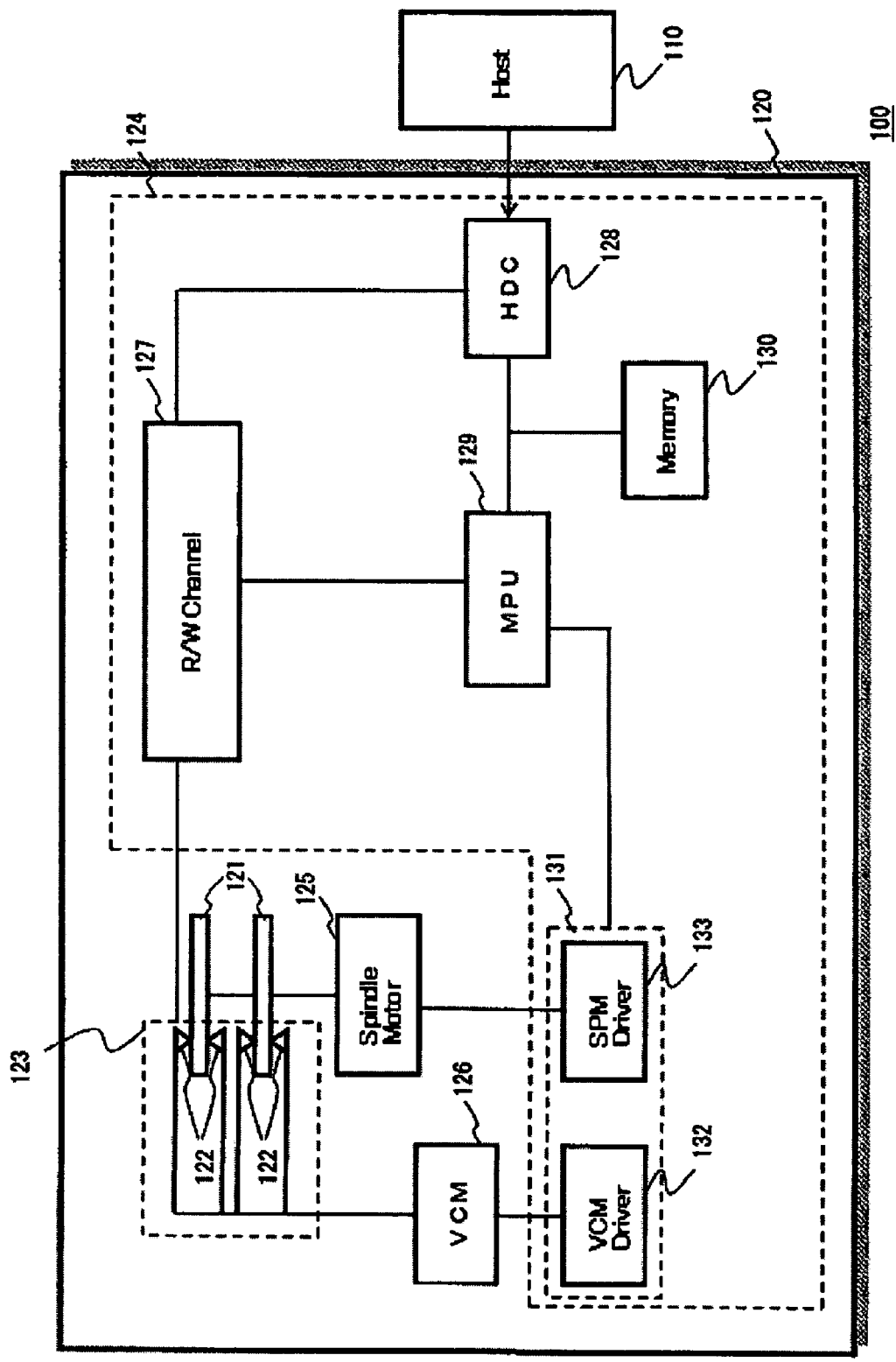
FIG. 1 is a block diagram which schematically shows the configuration of a data processing system according to an embodiment of the present invention.

Embodiments of the present invention will thereinafter be described. The following describes how the present invention is applicable and is not intended to limit the scope of the present invention to the specific embodiments described below. In the interest of clarification, omission and simplification are made, where appropriate, in the following description and drawings. Those skilled in the art will be able to easily make modifications, additions and alternations to each element of the embodiment within the scope of the preset invention. Also note that identical reference numerals are used to designate identical elements that are common to the figures and redundant description is avoided as appropriate in the interest of clarification.

FIG. 1 is a block diagram depicting the general configuration of a data processing system 100 in an embodiment. The data processing system 100 includes a host 110 which is a computer, a digital camera or the like performing data processing; and a hard disk drive (HDD) 120 which is an example of a data storage device. The HDD 120 stores data transmitted from the host 110. The HDD 120 includes one or more magnetic disks 121 as an example of a storage medium; a head stack assembly 123 having magnetic heads 122 associated respectively with the recording surfaces of the magnetic disk 121; and a controller 124 which controls these elements in order to write data to the magnetic disk 121 and read data from the magnetic disk 121.

Host user data transmitted from the host 110 is subjected to necessary processing and converted to a write signal by the controller 124. The write signal is sent to the head stack assembly 123. According to the acquired write signal, the magnetic heads 122 write data to the recording surfaces of the magnetic disk 121. On the other hand, a read signal retrieved from the magnetic disk 121 by the magnetic heads 122 is converted to a digital signal and subjected to necessary processing by the controller 124. The digital signal is transmitted to the host 110.

The magnetic disk 121 is a nonvolatile recording medium having magnetic layers which are magnetized to record data. When the HDD 120 is operating, the magnetic disk 121 is driven to rotate at a prescribed speed around the spindle shaft of the spindle motor 125. When the HDD 120 is not operating, the magnetic disk 121 remains stationary. On the surfaces of the magnetic disk 121, plural tracks are concentrically formed as data storage partitions.

On the surfaces of the magnetic disk 121, plural servo data recording areas are formed in the radial direction of the magnetic disk 121. User data recording areas are formed between servo data recording areas. Each track in the user data recording areas is divided into a plurality of circumferential sectors. Servo data is retrieved by the magnetic heads 122, making it possible to acquire information about the position of the magnetic heads 122. The servo data has track data providing track number information; sector data providing sector number information; and a burst pattern.

Mounted in the frame so as to be able to move pivotally along the surfaces of the magnetic disk 121, the head stack assembly 123 is driven by a voice coil motor (VCM) 126. Sliders are fixed at the front end of the head stack assembly 123. A magnetic head 122 is fixed at a surface of each slider. Typically, each magnetic head 122 is a thin film device having both read and write heads integrated. As the head stack assembly 123 moves pivotally, the magnetic heads 122 move in the radial direction of the magnetic disks 121 over the surfaces thereof. This allows the magnetic heads 122 to access desired tracks.

In the example of FIG. 1, the head stack assembly 123 has two magnetic heads 122 for each magnetic disk 121 and the two magnetic heads are respectively associated with the top and bottom surfaces of the corresponding magnetic disk 121. Note that it is also possible for the HDD 120 either to have only one magnetic disk 121 or to have magnetic heads 122 which are all associated with the top or bottom surfaces of the corresponding magnetic disks.

As shown in FIG. 1, the controller 124 includes a read/write channel (R/W channel) 127, a hard disk controller (HDC) 128, a microprocessor unit (MPU) 129, a memory 130 and a motor driver unit 131. The motor driver unit 131 has a voice coil motor driver (VCM driver) 132 and a spindle motor driver (SPM driver) 133.

The R/W channel 127 performs write and read operations according to data acquired from the host 110. In a write operation, the R/W channel 127 code-modulates write data supplied from the HDC 128 and converts the resulting write data to a write signal (current signal). The write signal is supplied to the magnetic heads 122. The magnetic heads 122 write the data to the magnetic disk 121 by letting current flow through the coils according to the obtained signal. In addition, when data is to be supplied to the host 110, read operation is performed. In a read operation, the R/W channel 127 picks up data from a read signal supplied from the magnetic heads 122 and subjects the data to decode processing. The retrieved data, after subjected to decode processing, is supplied to the HDC 128.

Operating according to microcodes loaded to the memory 130, the MPU 129 executes not only the general control of the HDD 120, including magnetic head 122 positioning control, interface control and defect management, but also data processing-related necessary processing. In particular, in handling a sector buffer (cache operation) for data communication with the host 110, the MPU 129 executes processing characteristic of this embodiment. Sector buffer handling in this embodiment will be described later in detail. When the HDD 120 is started, the microcodes to operate on the MPU 129 and the data to be required for control and data processing are loaded to the memory 130 from the magnetic disk 121 or a ROM (not shown).

Digital data read out by the R/W channel 127 includes servo data in addition to user data from the host 110. The R/W channel 127 extracts servo data from the readout data. According to microcodes, the MPU 129 performs positioning control processing of the magnetic head 122 by using the servo data. Control data from the MPU 129 is output to the VCM driver 132. The VCM driver 132 supplies drive current to the VCM 126 according to the control signal. In addition, the MPU 129 sets SPM control data to a register in the motor driver unit 131 according to microcodes in order to control the rotation of the spindle motor 125. The SPM driver 133 executes the rotational control of the spindle motor 125 according to the set SPM control data. Note that the HDD 120 may also be configured such that the HDC 128 performs servo control.

The HDC 128 has a capability of interfacing with the host 110. The HDC 128 receives user data and read, write and other commands transmitted from the host 110. The received user data is transferred to the R/W channel 127. In addition, readout data from the magnetic disk 121, acquired from the R/W channel 127, and data transfer control data are transmitted to the host 110 by the HDC 128. Further, the HDC 128 executes user data error correction processing and the like.

Transmission of control data and user data between the HDC 128 and the host 110 and transmission of user data between the HDC 128 and the magnetic disk 121 (R/W channel) are controlled by microcodes which operate on the HDC 128 and the MPU 129. The HDD 120 in this embodiment is provided with a sector buffer in which write data transmitted from the host 110 or read data to be transmitted to the host 110 is temporally stored. By performing data communications with the host 110 via the sector buffer, it is possible to reduce or omit the time to access the magnetic disk 121 in order to improve the performance. Buffer handling (cache operation) in this embodiment is described below.

Several buffer handling methods (cache features) are known. By selectively using one or multiple cache features, it is possible to constitute a plurality of buffer handling modes (hereinafter referred to as cached modes). The HDD 120 in this embodiment is provided with a plurality of cache modes and can change the cache mode to be used. According to the OS (Operating System) of the host 110, in particular to the file system of the OS, the host 110 can change the cache mode so as to select an appropriate one in order to raise the performance. Here, the file system means the file management system using the OS and determines the internal file management method of the HDD 120.

The HDD 120 refers to the MBR (Master Boot Record) which is used by the host to identify the system when the host is started, so that the HDD 120 knows the file system to be used and determines an appropriate cache mode. The MBR is preliminarily recorded on the magnetic disk 121. To access the HDD 120, the host requires this information. In addition to an OS boot program, the MBR has a partition table to store partition information. The partition table includes a partition type field which indicates the type of the file system. An appropriate cache mode can be determined internally in the HDD 120 according to the MBR recorded on the magnetic disk 121 without the necessity of being informed by the host. Note that it is also possible that the HDD 120 is provided with a non-volatile memory, separate from the magnetic disk 121, to store the MBR therein.

Figure 2:
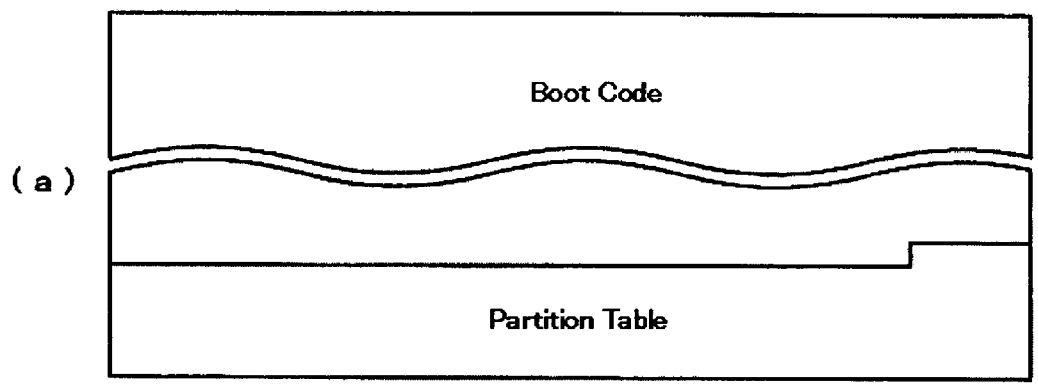
FIG. 2 schematically shows the data structures of MBR and partition table according to the embodiment.

Typically, the HDD 120 is divided into a plurality of partitions for use. The respective partitions are used by the host 110 as logically separate drives. The portioning is indicated in the partition table. FIG. 2(*a*) schematically depicts the data structure of the MBR. The MBR includes a boot code and a partition table. The boot code is a program to read out a boot program from an active partition. Stored in the partition table are the positions and sizes of partitions on the magnetic disk 121, an OS-identifying ID and the like.

Typically, the partition table has four 16-byte entries and makes it possible to divide the HDD into four partitions. As shown in FIG. 2(*b*), each entry has the following fields: Active Flag, CHS (Cylinder Head Sector) Start Sector, Partition Type, CHS End Sector, LBA (Logical Block Address) Start Sector and Partition Size. Active Flag is typically used to specify the boot partition. CHS Start Sector and CHS End Sector respectively specify the start sector and end sector in CHS. LBA Start Sector designates the start sector in LBA.

Partition Type specifies the type of the file system used in that partition. Several file systems (partition types) are known, such as FAT16 (File Allocation Table 16) (CHS), FAT16 (LBA), FAT 32 (LBA), FreeBSD, NTFS (New Technology File System), OS/2Boot Manager hidden FAT16, and Linux Swap. These file systems are well known techniques and their description will be omitted.

What cache mode is efficient is dependent on the file system. Thus, it is possible to raise the performance if the optimum cache mode is determined according to the file system. The HDD 120 refers to the partition type field of the partition table when the MBR is read out during boot, so that the HDD 120 can identify the file system of the host and select a cache mode according to the file system. After booted, the sector buffer is controlled in the selected cache mode.

The following describes specific examples of cache features and cache modes. In conjunction with this embodiment, (1) Write Back Read Cache, (2) Inhibit Read Abort Operation, and (3) Read Before Pending Write are described as cache features. With "(1) Write Back Read Cache" enabled, if data to be read by a received read command corresponds to write data held in the sector buffer, the write data is returned to the host 110 regardless of whether its write to the magnetic disk 121 has completed or not.

With "(2) Inhibit Read Abort Operation" enabled, "Read Abort Operation" is inhibited. If a write command is received while data is being looked ahead, "Read Abort Operation" aborts the read operation and begins processing the write command. "Inhibit Read Abort Operation" inhibits this operation. With "(3) Read Before Pending Write" enabled, the HDD 120 executes processing of the next read command before processing the preceding write command. In more detail, if the HDD 120 receives a write command and write data from the host 110, it stores the write data in the sector buffer and returns a command complete to the host 110. If the HDD 120 receives a read command from the host 110 after that, it executes the read operation before the write operation.

It is possible to constitute a plurality of cache modes by respectively using the above-mentioned cache features or combining some of them. For example, the following cache modes can be prepared:
(a) No Specific Feature
(b) Write Back Read Cache
(c) Inhibit Read Abort Operation
(d) Write Back Read Cache and Inhibit Read Abort Operation
(e) Read Before Pending Write and Inhibit Read Abort Operation
(f) Write Back Read Cache and Read Before Pending Write and Inhibit Read Abort Operation Where, "(a) No Specific Feature" is a cache mode where none of the above-mentioned cache features (1) through (3) are used. In each of cache modes (d), (e) and (f) which respectively include a plurality of cache features, the included cache features are all executed. Note that the above-cited list of cache modes is an example. It is also possible to set other appropriate cache modes by using other cache features or combining other cache features.

Figure 3:
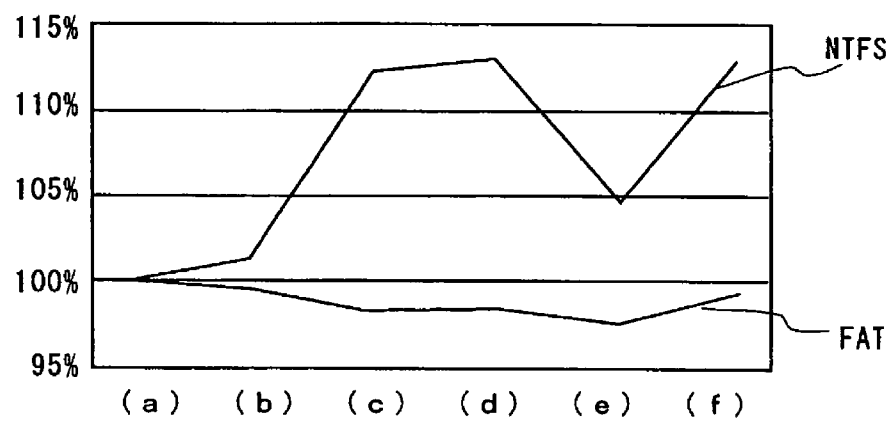
FIG. 3 is a graph showing benchmark test results for each cache mode and file system combination according to the embodiment.

FIG. 3 is a graph showing the result of a benchmark test performed on each combination of the above-mentioned cache modes and prescribed file systems. The X axis represents the cache mode whereas the Y axis represents the measured value. Business DiskWinWark99 was used as the benchmark test program. In the benchmark test, predefined pattern data was input and output repeatedly to measure its speed or the performance of the HDD. FAT32 (LBA) and NTFS which are typical among PCs were selected as the file systems. For each of FAT32 (LBA) and NTFS, benchmark test measurement was performed in the above-mentioned cache modes.

In the graph of FIG. 3, the score in cache mode (a) is assumed as 100%. The test results in the other cache modes are shown relative to that in cache mode (a). A higher score indicates a higher performance. As understood from FIG. 3, cache mode (d) or (f) is the most suitable for NTFS whereas cache mode (a) is the most suitable for FAT32 (LBA). Thus, the most suitable cache mode in terms of performance differs depending on the file system. The HDD 120 in this embodiment can improve the performance by selecting an appropriate cache mode according to the file system.

Figure 4:
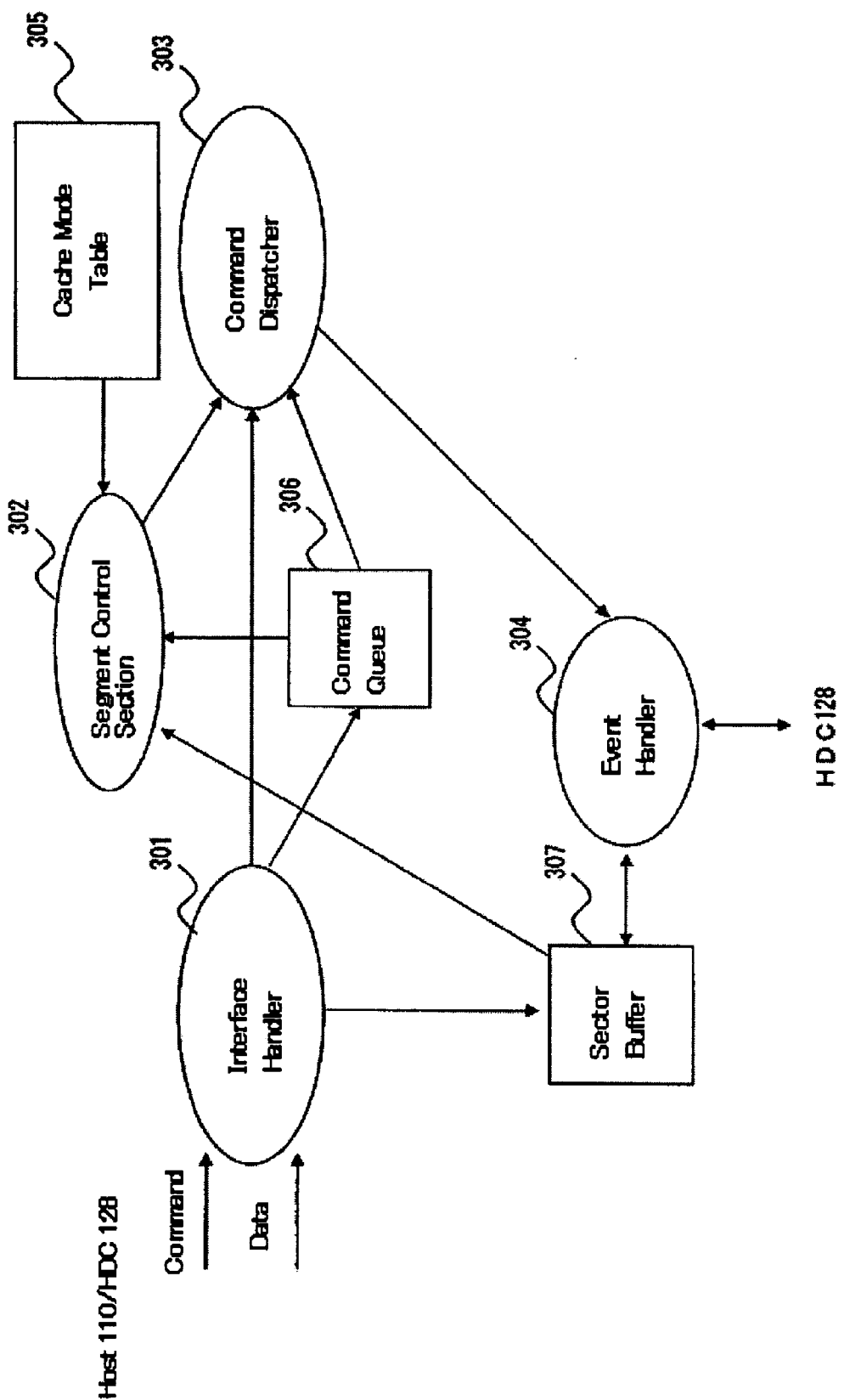
FIG. 4 is a block diagram showing the buffer handling-related logical configuration in this embodiment.

Cache mode control in the HDD 120 in this embodiment is described below in detail. FIG. 4 is a block diagram depicting a logical configuration which relates to the buffer handling of the HDD 120 in this embodiment. In FIG. 4, reference numeral 301 denotes an interface handler which controls the interface with the host 110 via the HDC 128. 302 denotes a segment control section which controls buffer handling and command execution. 303 is a dispatcher which dispatches an execution command. 304 is an event handler which controls read/write command execution.

Microcodes operating on the MPU 129 function as tasks associated with the respective components or the MPU 129 operating according to microcodes functions as the respective components. A cache mode table 305, a command queue 306 and a sector buffer 307 are formed in the memory 130. Cache modes in association with file systems are stored in the cache mode table 305. Execution commands are queued in the command queue 306. Read data and write data are stored in the sector buffer 307.

Note that each component can also be constructed by designing hardware or software or their combination. For example, the HDC 128 can be designed to perform part of the functions. In addition, the hardware configuration designed to implement each function in the HDD 120 can be changed appropriately.

As shown in FIG. 4, the interface handler 301 functions as an interface with the host 110 by controlling exchange of commands, user data and control data with the host 110. The segment control section 302 not only manages and controls the user data segments present in the sector buffer 307 but also reschedules the commands queued in the command queue 306 or determines an appropriate command execution order optimized in terms of performance. In addition, the segment control section 302 in this embodiment determines a cache mode according to the file system. The segment control section 302 controls command execution according to the determined cache mode.

The command dispatcher 303 refers to the command queue 306 and thereby dispatches commands according to the order determined by the segment control section 302. According to the command dispatched by the command dispatcher 303, the event handler 304 controls a data write or read operation with the magnetic disk 121. In a write operation, the event handler 304 reads out data from the sector buffer 307 and outputs the data together with a write request to the HDC 128. In a read operation, data read out from the magnetic disk 121 is acquired by the event handler 304 from the HDC 128. The acquired data is stored in the sector buffer 307 by the event handler 304.

FIG. 5 shows an example of a configuration of the cache mode table 305. For example, the aforementioned six cache modes are registered in the cache mode table 305. Each cache mode is stored in association with a file system in the cache mode table 305 so that a single cache mode is determined for each file system. For different file systems, either the same cache mode or different cache modes may be registered. If the most suitable cache modes for file systems is determined and selected based on actually measured values through benchmark test, it is possible to appropriately configure the cache mode table 305.

Figure 6:
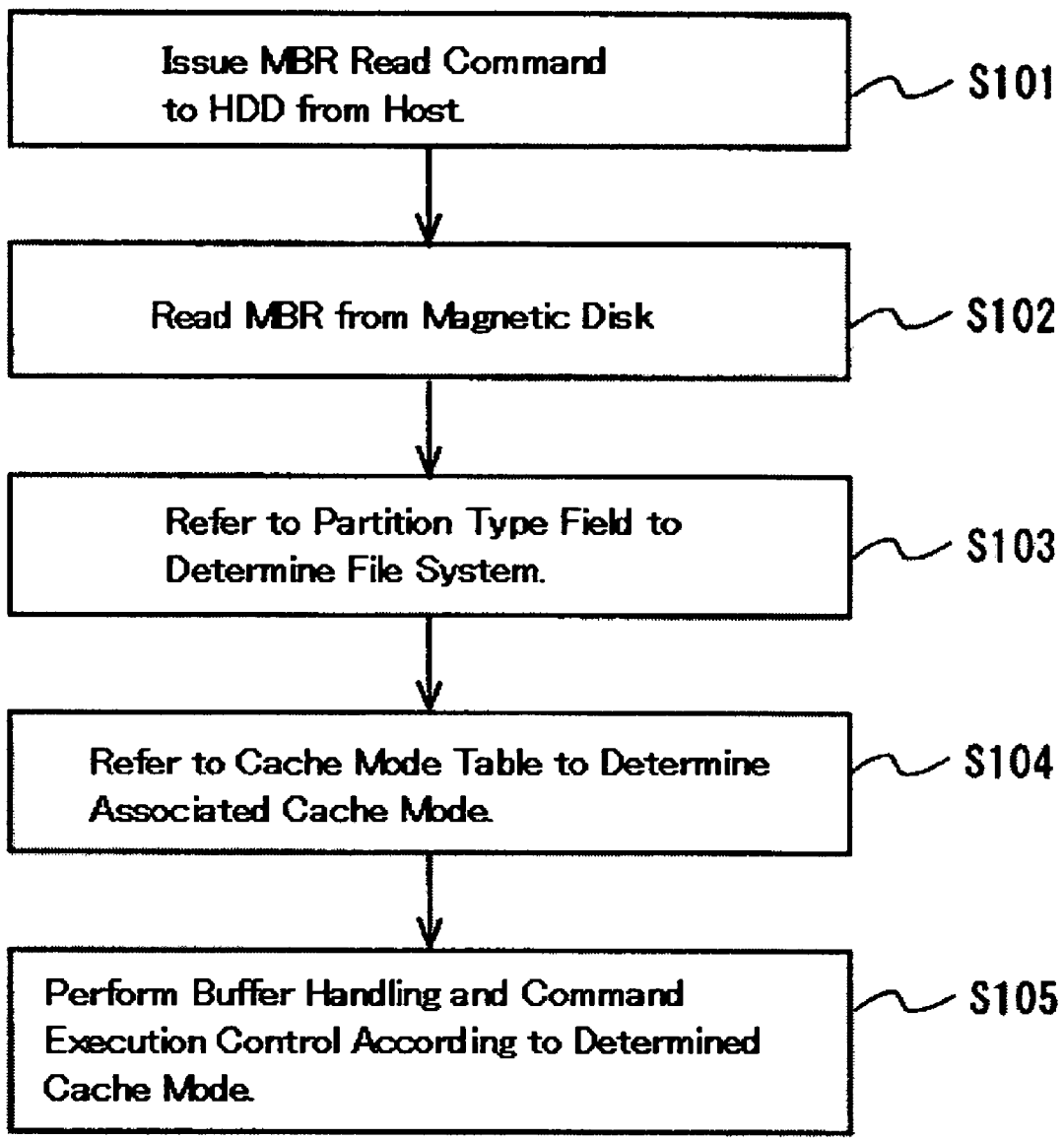
FIG. 6 is a flowchart showing how cache mode determination processing is done in this embodiment based on the file system.

The following describes the operation of the logical configuration shown in FIG. 4. Firstly, with reference to a flowchart in FIG. 6, let us describe how a cache mode is determined according to the file system to be used by the host 110 when the system 100 is started. The most suitable cache mode is determined when the system 100 is started, that is, as early as before the first transmission of user data is started with the host 110. When the system 100 is started, the host 110 issues a read command to the HDD 120 in order to read MBR, an example of management information (S101). The interface handler 301 receives the read command. In response to a request from the interface handler 301, the segment control section 302 operates to acquire information about the read command from the interface handler 301 and examine relations between this command and the data in the sector buffer 307.

Since no data is stored in the sector buffer 307, the interface handler 301 registers the command information about the read command in the command queue 306 without performing particular processing. In response to a request from the interface handler 301, the command dispatcher 303 is activated. To the event handler 304, the command dispatcher 303 gives a seek/read instruction for the read command queued in the command queue 306. According to the instruction from the command dispatcher 303, the event handler 304 requests the HDC 128 to read the MBR from the magnetic disk 121.

The MBR read out from the magnetic disk 121 is stored in the sector buffer 307 by the event handler 304 (S102). The segment control section 302 acquires the MBR stored in the sector buffer 307 and refers to the partition type field to identify the file system (partition type) (S103). Thus, the segment control section 302 functions as a file system identifying section. The segment control section 302 refers to the cache mode table 305 so as to determine a cache mode associated with the file system stored in the MBR (S104). Thus, the segment control section 302 functions as a cache mode determining section. In the subsequent read and write operations, the segment control section 302 performs buffer handling and command execution control according to the determined cache mode (S105).

Figure 7:
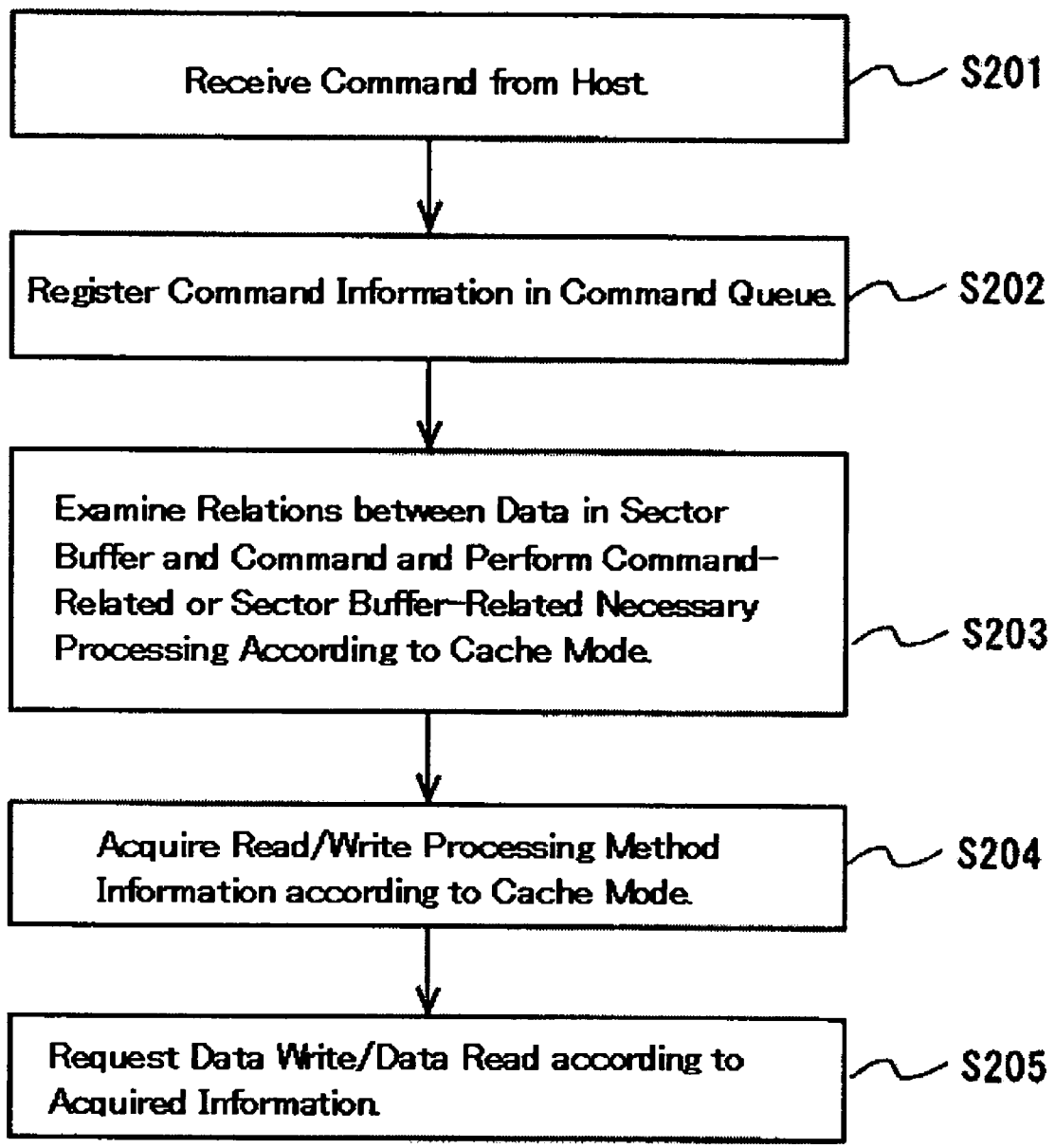
FIG. 7 is a flowchart showing how read/write operations are done in this embodiment after a cache mode is determined.

Then, the following provides a general description of how read/write operations are performed after the cache mode is determined with reference to FIG. 7. If a command is transmitted from the host 110, the interface handler 301 receives the command (S201). In the case of a write command, the interface handler 301 receives write data from the host 110 and stores the data in the sector buffer 307. Called by a request from the interface handler 301, the segment control section 302 obtains command information from the interface handler 301.

The interface handler 301 registers command information about the command acquired from the host 110 in the command queue 306 (S202). The command information includes, for example, command type, LBA, data length and data page stored in the sector buffer 307. Then, the segment control section 302 examines relations between the data in the sector buffer 307 and the command transmitted from the host 110 and, according to the cache mode, performs necessary processing concerning the command or the sector buffer 307 (S203). For example, if a read command is received from the host 110 while the requested data is present in the sector buffer 307, the data in the sector buffer 307 can be returned to the host 110 as a cache hit. When a write command is received, the segment control section 302 performs such processing as to abandon the data which has been stored in the sector buffer 307 and has the same address.

Then, in response to a request from the interface handler 301, the command dispatcher 303 is activated. The command dispatcher 303 acquires information from the segment control section 302 about the method of read from or write to the magnetic disk 121 according to the cache mode.

According to the cache mode, the segment control section 302 passes information about the read/write operation method (S204). The command dispatcher 303 instructs the event handler 304 according to the acquired information. Receiving seek, read, write and other instructions, the event handler 304 requests the HDC 128 to write and read data to and from the magnetic disk 121 (S205).

Note that each processing is not limited to the corresponding one in the aforementioned logical configuration, in which designers can design storage devices with efficient function and circuit configuration. Also note that although the HDD 120 in this embodiment is capable of performing read and write operations, the present invention may also be applied to reproducing-only devices. In addition, although it is preferable that cache mode determination be made internally by the HDD based on data within the HDD, it is also possible for the HDD to identify the file system and select a cache mode suitable for the file system based on information from the host. Also note that although the present invention is particularly useful for magnetic disk storage devices, it is also applicable to other types of storage devices which drive recording media, such as optical disk storage devices.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A data storage device comprising:
a data storing medium for storing file system identifier data in a master boot record, the file system identifier data identifying one of a plurality of file systems;
a sector buffer in which write data to the data storing medium and/or read data from the data storing medium are temporally stored;
a cache mode determining section configured to determine at a start-up time, a cache mode that is suitable for the file system based on the file system identifier data stored on the data storing medium, wherein the cache mode is one of a plurality of cache modes comprising: a) no specific feature; b) Write Back Read Cache; c) Inhibit Read Abort Operation; d) Write Back Read Cache and Inhibit Read Abort Operation; e) Read Before Pending Write and Inhibit Read Abort Operation; and f) Write Back Read Cache and Read Before Pending Write and Inhibit Read Abort Operation;
a cache mode table having registered therein the plurality of file systems, wherein the cache mode table associates each file system with a corresponding cache mode, and the cache mode table includes each of the plurality of cache modes including: a) no specific feature, b) Write Back Read Cache, c) Inhibit Read Abort Operation, d) Write Back Read Cache and Inhibit Read Abort Operation, e) Read Before Pending Write and Inhibit Read Abort Operation, and f) Write Back Read Cache and Read Before Pending Write and Inhibit Read Abort Operation; and
a control section handling the sector buffer according to the determined cache mode,
wherein the cache mode is a method for processing the write data and/or the read data stored in the sector buffer and for controlling execution of write commands and read commands received from a host;
wherein the cache mode is determined by reading the master boot record to identify a file system associated with the host and identified by the file system identifier data and by using the identified file system to access the cache mode table to determine the cache mode that is suitable for the file system, the cache mode being determined when the host is started and prior to transmission of user data;
wherein when the cache mode is a Write Back Read Cache mode, then if data to be read by a received read command corresponds to write data held in the sector buffer, the write data is returned to the host regardless of whether or not the write data has been written to the data storing medium;
wherein when the cache mode is a Inhibit Read Abort Operation cache mode, then if a write command is received while data is being looked ahead, a current read operation is aborted and processing of the write command is started; and
wherein when the cache mode is a Read Before Pending Write cache mode, then processing of a subsequent read command is executed before processing of a preceding write command.

2. A data storage device according to claim 1, wherein the plurality of cache modes is registered in the cache table preliminarily.

3. A data storage device according to claim 1, wherein:
the data storage device further includes a file system identifying section which refers to the file system identifier data to identify the file system stored on the data storing medium; and
the cache mode determining section determines the cache mode suitable for the file system identified by the file system identifying section.

4. A data storage device according to claim 3, wherein the file system identifying section identifies the file system and the cache mode determining section determines the cache mode when the data storage device is started.

5. A magnetic disk storage device according to claim 1, wherein the data storing medium comprises a magnetic disk, and further comprising:
a hard disk controller;
a command dispatcher which is configured to receive information about read/write operation from the control section according to the determined cache mode; and
an event handler configured to receive an instruction from the command dispatcher and to request the hard disk controller to read/write data to/from the magnetic disk based on the information about read/write operation.

6. A control method for a data storage device, the device including a medium storing data from a host and a sector buffer temporally storing data from the host in data transfer between the medium and the host, wherein the medium stores file system identifier data in a master boot record, the file system identifier data identifying one of a plurality of file systems, said control method comprising:
determining a cache mode that is suitable for the identified file system based on file system identifier data stored on the medium, wherein the cache mode is one of a plurality of cache modes comprising: a) no specific feature; b) Write Back Read Cache; c) Inhibit Read Abort Operation; d) Write Back Read Cache and Inhibit Read Abort Operation; e) Read Before Pending Write and Inhibit Read Abort Operation; and f) Write Back Read Cache and Read Before Pending Write and Inhibit Read Abort Operation;
registering the plurality of file systems in a cache mode table, wherein the cache mode table associates each file system with a corresponding cache mode, and the cache mode table includes each of the plurality of cache modes including: a) no specific feature, b) Write Back Read Cache, c) Inhibit Read Abort Operation, d) Write Back Read Cache and Inhibit Read Abort Operation, e) Read Before Pending Write and Inhibit Read Abort Operation, and f) Write Back Read Cache and Read Before Pending Write and Inhibit Read Abort Operation; and
handling the sector buffer according to the determined cache mode,
wherein the cache mode is a method for processing the data stored in the sector buffer and for controlling execution of received read commands and write commands;
wherein the cache mode is determined by reading the master boot record to identify the file system to be used by the host and identified by the file system identifier data and by using the identified file system to access the cache mode table to determine the cache
mode that is suitable for the file system, the cache mode being determined when the host is started and prior to transmission of user data;
wherein when the cache mode is a Write Back Read Cache mode, then if data to be read by a received read command corresponds to write data held in the sector buffer, the write data is returned to the host regardless of whether or not the write data has been written to the data storing medium;

wherein when the cache mode is a Inhibit Read Abort Operation cache mode, then if a write command is received while data is being looked ahead, a current read operation is aborted and processing of the write command is started; and wherein when the cache mode is a Read Before Pending Write cache mode, then processing of a subsequent read command is executed before processing of a preceding write command.

7. A control method for a data storage device according to claim 6, wherein the file system identifier data is stored preliminarily in the data storage device.

8. A control method for a data storage device according to claim 6, wherein the plurality of cache modes is registered in the cache mode table preliminarily.

9. A magnetic disk storage device comprising:

a magnetic disk storing data from a host;

a sector buffer temporally storing data from the host in data transfer between the magnetic disk and the host;

a file system identifying section which acquires at a start-up time, a master boot record stored on the magnetic disk to identify a file system to be used by an operating system of the host, wherein the master boot record stores file system identifier data, the file system identifier data identifying the file system to be used by an operating system of the host:

a memory section which stores a cache mode table registering therein plural file systems, wherein the cache mode table associates each fie system with a corresponding cache mode, and the cache mode table includes each of the plurality of cache modes including: a) no specific feature, b) Write Back Read Cache, c) Inhibit Read Abort Operation, d) Write Back Read Cache and Inhibit Read Abort Operation, e) Read Before Pending Write and Inhibit Read Abort Operation, and f) Write Back Read Cache and Read Before Pending Write and Inhibit Read Abort Operation;

a cache mode determining section which searches the cache mode table using the file system identifier data and determines a cache mode to be associated with the identified file system, wherein the cache mode is one of a plurality of cache modes comprising: a) no specific feature; b) Write Back Read Cache; c) Inhibit Read Abort Operation; d) Write Back Read Cache and Inhibit Read Abort Operation; e) Read Before Pending Write and Inhibit Read Abort Operation; and f) Write Back Read Cache and Read Before Pending Write and Inhibit Read Abort Operation; and a control section which handles the sector buffer according to the determined cache mode, wherein the cache mode is a method for processing the data stored in the sector buffer and for controlling execution of received read commands and write commands from a host;

wherein the cache mode is determined by reading the master boot record to identify a file system associated with the host and identified by the file system identifier data and by using the identified file system to access the cache mode table to determine the cache mode that is suitable for the file system, the cache mode being determined when the host is started and prior to transmission of user data;

wherein when the cache mode is a Write Back Read Cache mode, then if data to be read by a received read command corresponds to write data held in the sector buffer, the write data is returned to the host regardless of whether or not the write data has been written to the data storing medium;

wherein when the cache mode is a Inhibit Read Abort Operation cache mode, then if a write command is received while data is being looked ahead, a current read operation is aborted and processing of the write command is started; and wherein when the cache mode is a Read Before Pending Write cache mode, then processing of a subsequent read command is executed before processing of a preceding write command.

10. A magnetic disk storage device according to claim 9, further comprising:

an interface handler configured to register command information received from the host in a command queue.

11. A magnetic disk storage device according to claim 10, further comprising:

a command dispatcher which is activated to issue an instruction in response to the command information registered by the interface handler in the command queue.

12. A magnetic disk storage device according to claim 11, further comprising:

a hard disk controller; and an event handler configured to request the hard disk controller to read the master boot record from the magnetic disk and provide the master boot record to the file system identifying section according to an instruction from the command dispatcher.

13. A magnetic disk storage device according to claim 10, wherein the control section is configured to examine relations between the data in the sector buffer and the command information registered by the interface handler in the command queue in order to perform necessary processing concerning the command information or the sector buffer.

14. A magnetic disk storage device according to claim 9, further comprising:

a hard disk controller;

a command dispatcher which is configured to receive information about read/write operation from the control section according to the determined cache mode; and an event handler configured to receive an instruction from the command dispatcher and to request the hard disk controller to read/write data to/from the magnetic disk based on the information about read/write operation.

* * * * *